(12) United States Patent
Finn

(10) Patent No.: US 7,877,483 B1
(45) Date of Patent: Jan. 25, 2011

(54) VIRTUAL LOCAL AREA NETWORK PRUNING PROTOCOL

(75) Inventor: Norman W. Finn, Livermore, CA (US)

(73) Assignee: Cisco Technology, Inc., San Jose, CA (US)

( * ) Notice: Subject to any disclaimer, the term of this patent is extended or adjusted under 35 U.S.C. 154(b) by 1028 days.

(21) Appl. No.: 10/281,541

(22) Filed: Oct. 28, 2002

(51) Int. Cl.
*G06F 15/16* (2006.01)
*H04L 12/28* (2006.01)

(52) U.S. Cl. ..................... 709/227; 370/256

(58) Field of Classification Search ......... 709/227–229; 370/256
See application file for complete search history.

(56) References Cited

U.S. PATENT DOCUMENTS

| | | | |
|---|---|---|---|
| 4,922,486 A | 5/1990 | Lidinsky et al. | |
| 5,150,360 A | 9/1992 | Perlman et al. | |
| 5,394,402 A | 2/1995 | Ross | |
| 5,574,860 A | 11/1996 | Perlman et al. | |
| 5,740,171 A | 4/1998 | Mazzola et al. | |
| 5,742,604 A | 4/1998 | Edsall et al. | |
| 5,751,967 A | 5/1998 | Raab et al. | |
| 5,764,636 A | 6/1998 | Edsall | |
| 5,884,018 A * | 3/1999 | Jardine et al. | 714/4 |
| 5,892,895 A * | 4/1999 | Basavaiah et al. | 714/4 |
| 5,920,699 A * | 7/1999 | Bare | 709/225 |
| 5,959,989 A * | 9/1999 | Gleeson et al. | 370/390 |
| 5,978,378 A | 11/1999 | Van Seters et al. | |
| 5,991,518 A * | 11/1999 | Jardine et al. | 714/4 |
| 6,128,665 A * | 10/2000 | Iturralde | 709/238 |
| 6,188,694 B1 * | 2/2001 | Fine et al. | 370/402 |
| 6,370,142 B1 * | 4/2002 | Pitcher et al. | 370/390 |
| 6,388,995 B1 * | 5/2002 | Gai et al. | 370/256 |
| 6,445,715 B1 * | 9/2002 | Annaamalai et al. | 370/466 |
| 6,515,969 B1 * | 2/2003 | Smith | 370/256 |
| 6,785,294 B1 * | 8/2004 | Ammitzboell et al. | 370/467 |
| 6,937,576 B1 * | 8/2005 | Di Benedetto et al. | 370/256 |
| 6,967,932 B2 * | 11/2005 | Jensen | 370/255 |
| 7,009,968 B2 * | 3/2006 | Ambe et al. | 370/389 |
| 7,099,317 B2 * | 8/2006 | Ambe et al. | 370/389 |
| 7,551,571 B2 * | 6/2009 | Goldberg et al. | 370/256 |
| 2002/0085557 A1 * | 7/2002 | Jensen | 370/390 |

(Continued)

OTHER PUBLICATIONS

U.S. Appl. No. 09/259,428, Michael R. Smith.

(Continued)

*Primary Examiner*—Benjamin R Bruckart
*Assistant Examiner*—Alicia Baturay
(74) *Attorney, Agent, or Firm*—Cesari and McKenna, LLP

(57) ABSTRACT

In one embodiment, an intermediate network device has a plurality of ports, and at least some of the ports are associated with Virtual Local Area Network (VLAN) designations. A spanning tree entity executes a spanning tree protocol to transition the ports among a plurality of spanning tree states. A VLAN port logic circuit is disposed at one or more of the ports and processes control packets advertising VLAN memberships. The VLAN port logic circuit, in response to receiving a control packet broadcast by another intermediate network device, asserts bits in a VLAN wanted vector for which the spanning tree state of the selected port is in the forwarding state, signifying that network messages associated with such VLAN designations are to be forwarded from the respective port. The VLAN wanted vectors may later be transmitted in control messages from the intermediate network device.

12 Claims, 9 Drawing Sheets

U.S. PATENT DOCUMENTS

2002/0120769 A1* 8/2002 Ammitzboell .............. 709/238

OTHER PUBLICATIONS

Configuring VLANs and Links, (c) 1988-1997, pp. 1-20.
VLAN Interoperability, VLAN Standardization via IEEE 802.10, (c) 1996, pp. 19-21.
Cisco IOS VLAN Services, New Cisco IOS VLAN Services Make "Virtual" a Reality, (c) 1996, pp. 15-21.
Cisco VLAN Roadmap, Comprehensive Products for Switched Internetworking, (c) 1996, pp. 2-21.
Lucent Technologies Inc.'s Intial Disclosure of Prior Art Under Civil Local Rule 16-7, U.S. District Court for the Northern District of California, C.A. No. C98-20836JW (PVT) ENE, Nov. 18, 1998.
Horowitz, S., Dual Layer Spanning Tree, A Spanning Tree Proposal for IEEE 802.1Q, May 14, 1997.
Delaney,. D. and Seaman, M., Single or Multiple Filtering Databases, May 8, 1997.
Horowitz, S., Dancing Bears, IEEE 802.1 Virtual LANs, Mar. 6, 1996.
Perlman, R., Interconnections: Bridges and Routers, (coo) 1992, pp. 54-64, Addison-Wesley Publishing Company, Inc.
IEEE Draft Standard for Virtual Bridged Local Area Networks, Jul. 4, 1996, pp. 1, 6-7 and 28-31.
IEEE Draft Standard for Virtual Bridged Local Area Networks, Aug. 30, 1996, pp. 1-7 and 35-39.
IEEE Draft Standard for Virtual Bridged Local Area Networks, May 16, 1997, pp. 1-10 and 20-21.
Finn, N. And Smith, M., Multiple 802.1Q Spanning Trees, Presentation at IEEE LMSC Meeting, Jul. 1998.
Configuring VTP and Virtual LANs, Cisco Systems, Inc., Dec. 30, 1998.
IEEE P802.1Q Draft Standards for Local and Metropolitan Area Networks: Virtual Bridged Local Area Networks, Mar. 1998, pp. 1-16, 91-96 and 195-204.
Information Technology—Telecommunications and Information Exchange Between Systems—Local and Metropolitan Area Networks-Common Specifications-Part 3: Media Access Control (MAC) Bridges: Revision, IEEE P802.1D/D15, Nov. 24, 1997, pp. 1-17, 22, 48-49, 63-65, 135-143 and 156-188.
IEEE P802.1Q Draft Standards for Local and Metropolitan Area Networks-Amendment 3 to 802.1Q Virtual Bridged Local Area Networks: Mutltiple Spanning Trees, Oct. 9, 2002, pp. 3-17, and 127-190.

* cited by examiner

| VLAN | STP STATE | CURRENT WANTED | WAITING WANTED | |
|---|---|---|---|---|
| 0 | | | | ~310a |
| 1 | | | | ~310b |
| 2 | | | | ~310c |
| 3 | | | | ~310d |
| 4 | | | | ~310e |
| 5 | | | | ~310f |
| 6 | | | | ~310g |
| 7 | | | | ~310h |
| 8 | | | | ~310i |
| 9  (R) | FORWARDING | | | ~310j |
| 10 | | | | ~310k |
| ... | | | | |
| 4087  (G) | BLOCKING | | | ~310l |
| 4088 | | | | ~310m |
| 4089 | | | | ~310n |
| 4090 | | | | ~310o |
| 4091  (B) | FORWARDING | | | ~310p |
| 4092 | | | | ~310q |
| 4093 | | | | ~310r |
| 4094 | | | | ~310s |
| 4095 | | | | ~310t |

FIG. 3

VIRTUAL LOCAL AREA NETWORK PRUNING PROTOCOL

BACKGROUND OF THE INVENTION

1. Field of the Invention

The present invention relates to computer networks and, more specifically, to computer networks configured to virtually associate different network segments.

2. Background Information

A computer network typically comprises a plurality of interconnected entities. An entity may consist of any network device, such as a server or end station, that "sources" (i.e., transmits) or "sinks" (i.e., receives) data frames. A common type of computer network is a local area network ("LAN") which typically refers to a privately owned network within a single building or campus. LANs typically employ a data communication protocol (LAN standard), such as Ethernet, FDDI or token ring, that defines the functions performed by the data link and physical layers of a communications architecture (i.e., a protocol stack). In many instances, several LANs are interconnected by point-to-point links, microwave transceivers, satellite hook-ups, etc. to form a wide area network ("WAN") or intranet that may span an entire country or continent.

One or more intermediate network devices are often used to couple LANs together and allow the corresponding entities to exchange information. For example, a bridge may be used to provide a "switching" function between two or more LANs or end stations. Typically, the bridge is a computer and includes a plurality of ports that are coupled via LANs either to other bridges, or to end stations, such as routers or host computers. Ports used to couple bridges to each other are generally referred to as a trunk ports, whereas ports used to couple bridges to end stations are generally referred to as access ports. The bridging function includes receiving data from a sending entity at a source port and transferring that data to at least one destination port for forwarding to one or more receiving entities.

Bridges typically learn which destination port to use in order to reach a particular entity by noting on which source port the last message originating from that entity was received. This information is then stored in a block of memory referred to as a filtering database. Thereafter, when a message addressed to a given entity is received on a source port, the bridge looks up the entity in its filtering database and identifies the appropriate destination port to reach that entity. If no destination port is identified in the filtering database, the bridge floods the message out all ports, except the port on which the message was originally received. Messages addressed to broadcast or multicast addresses are also flooded.

Spanning Tree Algorithm

To avoid the formation of loops, most bridges and switches execute a spanning tree protocol which allows them to calculate an active network topology that is loop-free (i.e., a tree) and yet connects every pair of LANs within the network (i.e., the tree is spanning). The IEEE has promulgated a standard (IEEE Std. 802.1D-1998™ M) that defines a spanning tree protocol to be executed by 802.1D compatible devices. In general, by executing the 802.1D spanning tree protocol, bridges elect a single bridge within the bridged network to be the "root" bridge. The 802.1D standard takes advantage of the fact that each bridge has a unique numerical identifier (bridge ID) by specifying that the Root Bridge is the bridge with the lowest bridge ID. In addition, for each LAN coupled to any bridge, exactly one port (the "Designated port") on one bridge (the "Designated Bridge") is elected. The Designated Bridge is typically the one closest to the Root Bridge. All ports on the Root Bridge are Designated Ports, and the Root Bridge is the Designated Bridge on all the LANs to which it has ports. Each non-Root Bridge also selects one port from among its non-Designated Ports (its "Root Port") which gives the lowest cost path to the Root Bridge. The Root Ports and Designated Ports are selected for inclusion in the active topology and are placed in a forwarding state so that data frames may be forwarded to and from these ports and thus onto LANs interconnecting the bridges and end stations of the network. Ports not included within the active topology are placed in a blocking state. When a port is in the blocking state, data frames will not be forwarded to or received from the port. A network administrator may also exclude a port from the spanning tree by placing it in a disabled state.

To obtain the information necessary to run the spanning tree protocol, bridges exchange special messages called configuration bridge protocol data unit (BPDU) messages or simply BPDUs. BPDUs carry information, such as assumed root and lowest root path cost, used in computing the active topology. More specifically, upon start-up, each bridge initially assumes itself to be the Root Bridge and transmits BPDUs accordingly. Upon receipt of a BPDU from a neighboring device, its contents are examined and compared with similar information (e.g., assumed root and lowest root path cost) stored by the receiving bridge in memory. If the information from the received BPDU is "better" than the stored information, the bridge adopts the better information and uses it in the BPDUs that it sends (adding the cost associated with the receiving port to the root path cost) from its ports, other than the port on which the "better" information was received. Although BPDUs are not forwarded by bridges, the identifier of the Root Bridge is eventually propagated to and adopted by all bridges as described above, allowing them to select their Root Port and any Designated Port(s).

In order to adapt the active topology to changes and failures, the Root Bridge periodically (e.g., every hello time) transmits BPDUs. In response to receiving BPDUs on their Root Ports, bridges transmit their own BPDUs from their Designated Ports, if any. Thus, BPDUs are periodically propagated throughout the bridged network, confirming the active topology. As BPDU information is updated and/or timed-out and the active topology is re-calculated, ports may transition from the blocking state to the forwarding state and vice versa. That is, as a result of new BPDU information, a previously blocked port may learn that it should be in the forwarding state (e.g., it is now the Root Port or a Designated Port).

Virtual Local Area Networks

A computer network may also be segregated into a series of logical network segments. For example, U.S. Pat. No. 5,394, 402, issued on Feb. 28, 1995 to Ross (the "'402 Patent"), which is hereby incorporated by referenced in its entirety, discloses an arrangement for associating any port of a bridge with any particular segregated network group. Specifically, according to the '402 Patent, any number of physical ports of a particular bridge may be associated with any number of groups within the bridge by using a virtual local area network (VLAN) arrangement that virtually associates the port with a particular VLAN designation. More specifically, Ross discloses a bridge or hub that associates VLAN designations with at least one local port and further associates those VLAN designations with messages transmitted from any of the ports to which the VLAN designation has been assigned.

The VLAN designation for each local port is stored in a memory portion of the bridge such that every time a message is received by the bridge on a local port the VLAN designation of that port is associated with the message. Association is accomplished by a flow processing element which looks up the VLAN designation in the memory portion based on the local port where the message originated. In addition to the '402 patent, the IEEE has issued a standard for Virtual Bridged Local Area Networks, IEEE Std. 802.1Q-1998.

In many cases, it may be desirable to interconnect a plurality of these bridges in order to extend the VLAN associations of ports in the network. Ross, in fact, states that an objective of his VLAN arrangement is to allow all ports and entities of the network having the same VLAN designation to exchange messages by associating a VLAN designation with each message. Thus, those entities having the same VLAN designation function as if they are all part of the same LAN. Message exchanges between parts of the network having different VLAN designations are specifically prevented in order to preserve the boundaries of each VLAN segment. The IEEE Std. 802.1Q-1998 specification standard, for example, calls for the addition of a VLAN Identifier (VID) field to the header of network messages. The VID field may be loaded with a numeric value (0-4095) corresponding to the message's VLAN designation. For administrative convenience, each VLAN designation is often associated with a different color, such as red, blue, green, etc.

GVRP and VTP

A network that contains a number of VLANs may find it necessary for each bridge to maintain up-to-date information about which VLANs are accessible on which ports. Such information can be used to prevent messages associated with a given VLAN designation from being sent into areas of the network in which there are no members of the VLAN designation. To disseminate information across computer networks, the IEEE has developed the Generic Attribute Registration Protocol (GARP) as part of the IEEE 802.1D standard. A variation of GARP specially adopted for VLAN registration is the GARP VLAN Registration Protocol (GVRP) described in the IEEE Std. 802.1Q-1998 specification standard. Similarly, Cisco Systems, Inc of San Jose, Calif. has developed the VLAN Trunk Protocol (VTP) for internetwork communication and has created a VTP Pruning Protocol Extension specifically adapted to provide registration information used in restricting traffic. Both GVRP and VTP Pruning operate in software and follow a similar principle of "global information transmitted locally" in which each bridge transmits a complete copy of its current VLAN membership knowledge to its neighbors.

Both protocols include a control application associated with each port of a bridge in a LAN. The control application issues communications (declarations) that contain join (registration) and leave (deregistration) commands for membership in VLANs. Registration and deregistration commands contain information identifying the VLAN designations that the transmitting bridge needs to receive for its own ports as well as the ports of the bridges located "behind" or "downstream" of the transmitting bridge. In both protocols, a declaration may be issued in response to any of a number of events, such as an idle timer or a user initiated VLAN assignment. Declarations are only transmitted to adjacent or neighboring bridges. They are not forwarded. When a neighboring bridge receives a declaration, it creates or updates the Dynamic VLAN Registration Entries in its Port State vector, which is part of its filtering database, to indicate any new VLANs it must transmit. Further, any changes in the bridge's Dynamic VLAN Registration Entries causes the bridge to transmit declarations to its neighbors, which then transmit declarations to their neighbors, and so on, until the new the VLAN configuration is known throughout the network.

Both GVRP and VTP Pruning share a number of shortcomings. First, each bridge must include in its declarations a list of VLANs that includes both those specifically assigned to the bridge as well as those VLANs reachable "behind" the bridge. Assembling and updating this list requires repeated computation and processing. Second, bridges must calculate and transmit a different declaration containing a different VLAN registration and deregistration list on each of its ports. Otherwise, a bridge might indicate a need to receive messages associated with a given VLAN when, in fact, no such need exists. Finally, the prior art methods introduce significant delay in converging to an overall result. That is, when a new VLAN is needed at a particular bridge, there is considerable delay before the need is universally known throughout the network. This delay is due, in part, to the processing requirements at each bridge before the need can be propagated through the network. There is little opportunity to employ parallel processors to compute the declarations, as the declaration transmitted on each port depends on information received from all other ports on the bridge.

Thus, a need exits for a VLAN pruning protocol that consumes less overhead and converges quickly.

SUMMARY OF THE INVENTION

Briefly, the present invention relates to a system and method for distributing virtual local area network (VLAN) membership information across a bridged network. In the illustrative embodiment, VLAN pruning logic is included at each port of one or more intermediate network devices, such as bridges, disposed in the bridged network. The VLAN pruning logic is configured to generate and broadcast control messages that contain VLAN membership information solely for the respective bridge, i.e., bridge-local VLAN membership information. Each VLAN pruning logic also maintains a list of VLAN designations associated with its respective port based on the receipt of control messages from other bridges in the bridged network. Also disposed at each bridge is one or more forwarding engines for determining the port(s) from which messages received at the bridge are to be transmitted, and a spanning tree protocol entity for defining one or more loop-free topologies within the network. The spanning tree protocol entities of the bridges elect a root bridge and transition the bridge's ports among a plurality of spanning tree port states, including a blocking state and a forwarding state. The VLAN pruning logic also up-dates the list of VLANs associated with the port in response to receiving a VLAN-tagged frame, provided that the corresponding port is in the forwarding state for the frame's VLAN. Notably, the VLAN pruning logic prevents the forwarding engine from transmitting a network message that is associated with a given VLAN from the respective port, unless the VLAN pruning logic has associated the given VLAN with the port, even if the port is in a forwarding state for the given VLAN.

The control messages preferably include a trigger flag, and bridges generate and transmit one or more control messages of their own in response to receiving a control message whose trigger flag is asserted. To initiate the transmission of control messages by all bridges in the network, the root bridge periodically, e.g., every TRIGGER_TIME, issues one or more control messages with the trigger flag asserted. Preferably, each bridge waits a different period of time (not exceeding a JITTER value) before responding with its own control message. Both the root bridge and non-root bridges also issue one or more control messages with the trigger flag asserted if a port of the bridge is reconfigured to remove a previously existing VLAN. If a port is reconfigured to add a VLAN, the bridge preferably issues a control message without the trigger flag asserted. Additionally, non-root bridges issue one or more control messages with the trigger flag asserted if a port transitions to the forwarding state. If a port transitions out of the forwarding state, the bridge preferably waits a preset time, e.g., the DOWN_TIMER, to see if it receives any control messages having the trigger flag asserted thereby causing the bridge to send a control message in response. If the DOWN_TIMER expires without the bridge having received any such control messages, it generates and issues one or more control messages with the trigger flag asserted.

In the preferred embodiment, each bridge including the root bridge preferably sends a set number, e.g., NUMBER_TRIGGER, of control messages with the trigger flag asserted in response to a triggering event or occurrence. The transmission of each such control message, moreover, is separated by a preset time, e.g., the TRIGGER_INTERVAL. To prevent the issuance of control messages from overwhelming the network, the bridges preferably implement other safeguards in addition to the techniques described above. In particular, if, during a preset window of time during which a bridge is in the process of issuing its set number of control messages with the trigger flag asserted, the bridge receives a control message whose trigger flag is asserted, it responds with a single control message having the trigger flag de-asserted and skips the next control message in its set. That is, the control message sent in response to having received a control message with the trigger flag asserted replaces the next control message that would otherwise have been sent. In the preferred embodiment, the preset window of time is equal to TRIGGER_INTERVAL*1.5. Furthermore, after sending a control message with the trigger flag de-asserted or the last of the set number of control messages with the trigger flag asserted, the bridge starts a HOLDDOWN timer. If the bridge receives a control message with the trigger flag asserted before the HOLDDOWN timer expires, it does not generate and issue any control messages.

BRIEF DESCRIPTION OF THE DRAWINGS

The invention description below refers to the accompanying drawings, of which:

FIG. 3 is a highly schematic illustration of data structure in accordance with the present invention;

DETAILED DESCRIPTION OF AN ILLUSTRATIVE EMBODIMENT

Figure 1:
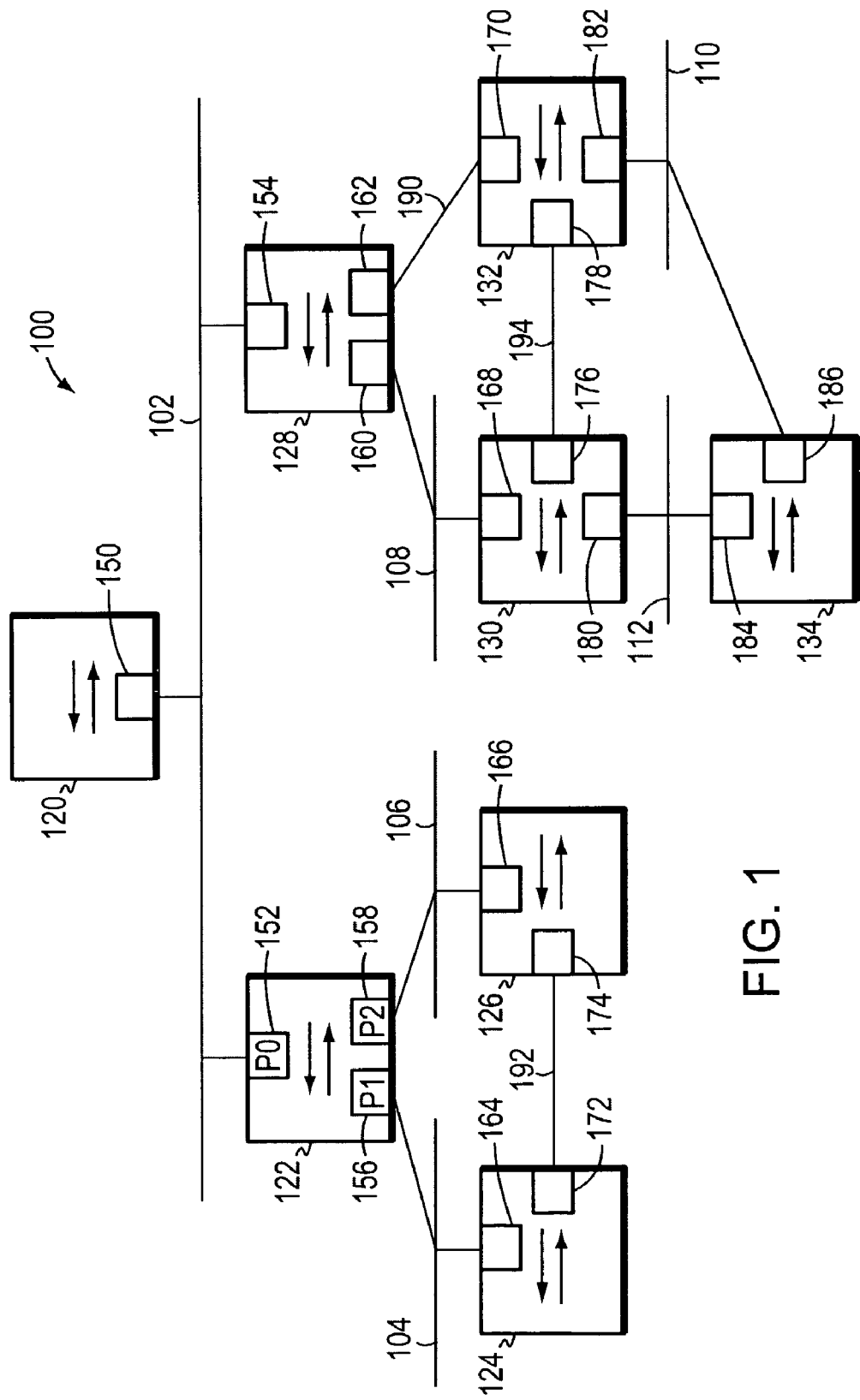
FIG. 1 is a highly schematic diagram of a computer network.

FIG. 1 is a highly schematic block diagram of a computer network 100 comprising a plurality of local area networks (LANs) 102-112 that are interconnected by a plurality of intermediate devices, such as bridges or switches 120-134. More specifically, each switch 120-134 has a plurality of ports, such as ports 150-186, and each LAN 102-112 is preferably coupled to at least one switch port 150-186. Coupled to each LAN 102-112 may be one or more end stations (not shown), such as personal computers, workstations, servers, etc. The switches 120-134 may alternatively or additionally be interconnected by one or more point-to-point links, such as point-to-point links 190-194.

It should be understood that the network 100 of FIG. 1 is meant for illustrative purposes only and that the present invention will operate with other networks having possibly far more complex topologies. For example, among other changes, one or more end stations may be directly coupled to the intermediate devices either by dedicated cables or wirelessly.

Switch ports that connect to an end station or to a LAN to which no other intermediate network device is coupled are referred to as "access ports". Switch ports that provide connectivity to another intermediate network device, such as ports coupled to point-to-point links or to LANs to which one or more other switches are also connected, are referred to as "trunk ports".

In addition, switches 120-134 are preferably configured to logically organize the network 100 into one or more Virtual Local Area Network (VLAN) segments. That is, subsets of LANs 102-112 as well as directly coupled end stations may be logically grouped together to form VLANs. For convenience, each VLAN designation may be identified by a color code, e.g., "R" for red, "B" for blue and "G" for green. Each VLAN designation may also have a corresponding numeric identifier. For example, the IEEE 802.1 Q specification standard allocates the numeric identifiers 0-4095 as possible VLAN designations, thereby supporting up to 4096 different VLAN designations within a bridged network.

Trunk ports, moreover, are preferably configured to operate in accordance with any number of VLAN encapsulation protocols, such as the encapsulation scheme described in the IEEE 802.1 Q Virtual Bridged Local Area Networks Protocol specification standard, which is hereby incorporated by reference in its entirety or the Interswitch Link (ISL) mechanism from Cisco Systems, Inc., as described in U.S. Pat. No. 5,742,604, which is also hereby incorporated by reference in its entirety. Those skilled in the art will understand that other VLAN encapsulation or tagging protocols may also be used.

As shown, network 100 includes redundant links interconnecting switches 120-134. For example, switch 124 is connected to switch 126 directly via point-to-point link 192 and via switch 122. The existence of such redundant links prevents portions of the network 100 from becoming isolated should any constituent link or device fail. Such redundancy, however, also results in the creation of loops, which, as described above, are highly undesirable. Execution of a spanning tree protocol prevents loops by defining a loop-free network topology (i.e., an active topology).

Several solutions exist for defining an active topology in bridged networks supporting VLAN segments. The IEEE 802.1 Q specification standard, for example, provides for the creation of a single active topology within the bridged network. All network messages, regardless of their VLAN association, use this one active topology. Cisco Systems, Inc. has developed a per-VLAN Spanning Tree Protocol that creates a separate active topology for each VLAN designation. With this approach, network messages associated with different VLAN designations travel along different paths through the bridged network. The IEEE is currently working on a draft standard, the IEEE 802.1s specification standard (the current version of which is draft 13, dated Jun. 13, 2002), which creates a plurality of active topologies that are shared by the VLANs. The draft 802.1s specification standard is hereby incorporated herein by reference. That is, a first set of VLAN designations may use one active topology, while a different set of VLAN designations use another active topology. Any of the spanning tree protocols designed for use with VLAN aware bridged networks may be used with the present invention.

Figure 2:
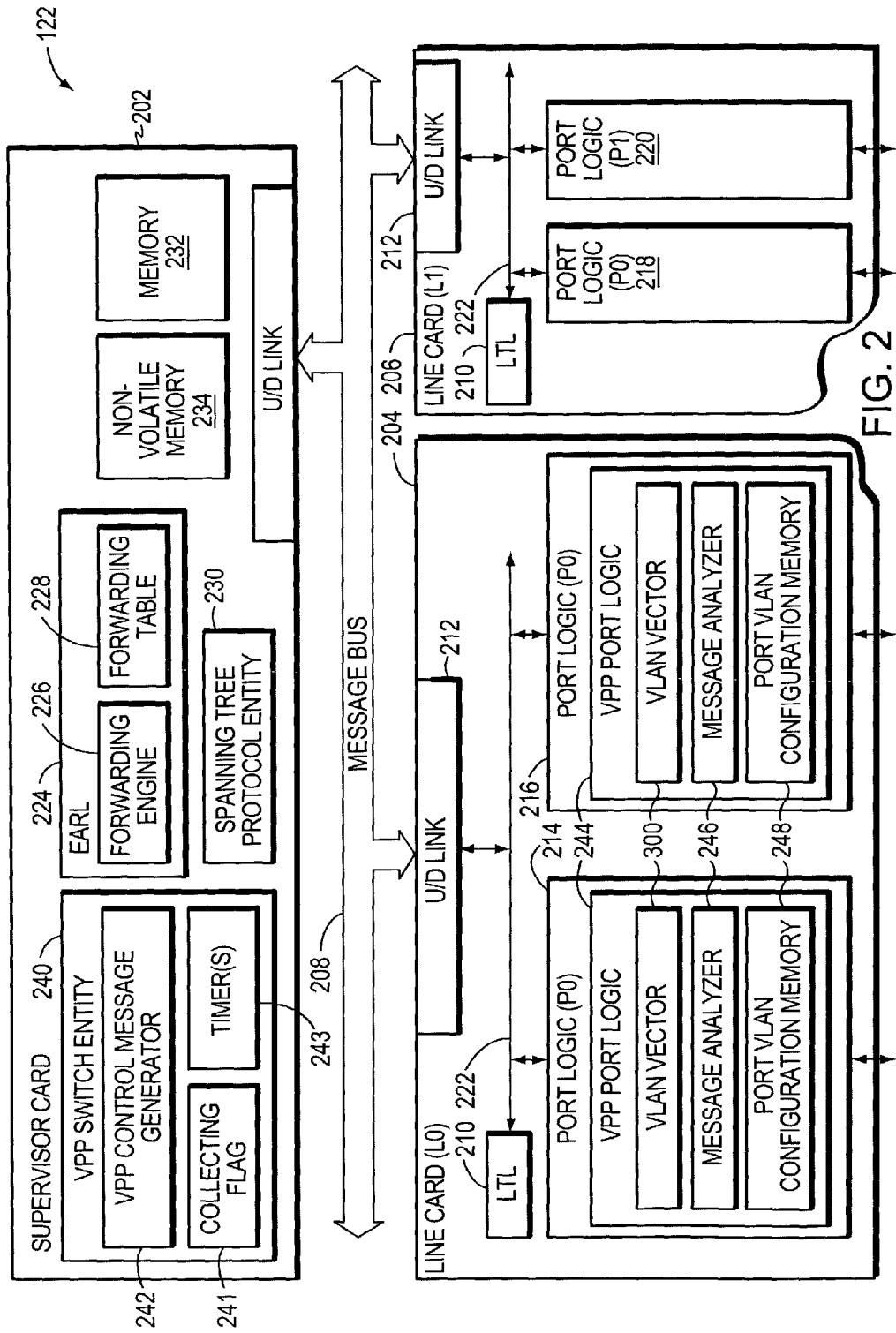
FIG. 2 is a highly schematic, partial block diagram of a bridge of the network of FIG. 1.

FIG. 2 is a partial block diagram of switch 122 configured in accordance with the present invention. Switch 122 preferably includes a supervisor card 202 and a plurality of line cards or modules 204 and 206 (e.g., line cards 0 and 1). Supervisor card 202 and line cards 204 and 206 are interconnected by a high speed message bus 208. Each line card 204 and 206, moreover, has a local target logic (LTL) memory 210, an up/down link (U/D link) interface circuit 212, and a plurality of port logic circuits, such as port logic circuits 214 and 216 at line card 204, and port logic circuits 218 and 220 at line card 206. Each port logic circuit defines or establishes a physical port for sending and receiving network messages to and from the bridged network 100 (FIG. 1). Each line card 206 and 206 may include other components, such as a microprocessor (not shown). The port logic circuits of each line card are interconnected with each other and with the LTL 210 and U/D link 212 by a local bus 222 disposed on the respective line card.

Port logic circuits 214-218 may correspond to trunk ports, while port logic circuit 220 may correspond to an access port.

The supervisor card 202 is configured to perform selected switch-wide functions, such as participating in and computing the active topology(ies) of the bridged network 100 and making forwarding decisions for network messages that traverse more than one line card. In order to render such forwarding decisions, the supervisor card 202 preferably includes an encoded address recognition logic (EARL) circuit 224 that executes all forwarding decisions between the ports P of the line cards 204 and 206. To that end, the EARL circuit 224 contains a forwarding engine 226 and at least one forwarding table 228 configured to produce a unique destination port index value. The LTL memories 210 disposed on the line cards 204 and 206 implement "local" forwarding decisions, i.e., forward decisions among ports of the same line card.

The supervisor card 202 further includes a spanning tree protocol (STP) entity 230 that cooperates in the computation of one or more active topologies within the bridged network 100. Supervisor card may also include or have access to a main memory 232 and a non-volatile memory 234 for storing configuration and other parameters, including STP parameters. A U/D link 236 at the supervisor card 202 provides connectivity to the message bus 208.

High speed message bus 208 is preferably a switching matrix employed to control the transfer of data among the various cards 202, 204 and 206 plugged into the switch 122. The UDlink 212 of each line card basically interfaces between the local bus 222 and the message bus 208. Inputs to the various LTL memories 210 may be received over the respective local buses 222, which are driven by the corresponding UDlinks 212. Switch 122 also includes a common bus (not shown) that similarly interconnects the line cards 204 and 206 and supervisor card 202 to support out-of-band communication among the cards 202, 204 and 206.

It should be understood that the supervisor card 202 may include other components, such as a network management processor(s) for running various protocols, its own port logic circuits (P), local target logic (LTL) memory and local bus.

Suitable intermediate network device platforms for use with the present invention include the commercially available Catalyst 4000 and 6000 series of switches from Cisco Systems, Inc. of San Jose, Calif.

In accordance with the present invention, the supervisor card 202 preferably includes a VLAN Pruning Protocol (VPP) switch entity 240 for distributing the VLAN membership information of switch 122 across the bridged network 100 in an efficient manner. The VPP switch entity 240 includes a collecting flag 241, one or more timers 243, and a message generator 242 for generating VPP control messages that are then provided to the ports (P) for forwarding into the bridged network 100, as described herein. In addition to the VPP switch entity 240, each port logic circuit that corresponds to a trunk port, such as port logic circuits 214-218, is provided with a VPP port logic circuit 244 that, in turn, has several components. Specifically, each VPP port logic circuit 244 has a message analyzer 246 for processing VPP control messages both received at and to be sent from the port. Each VPP port logic circuit 244 also maintains a VLAN vector 300 and a port VLAN configuration memory 248 for use in storing VLAN segments reachable via the port and VLAN membership information for the respective port, respectively. A given port may be associated with one or more VLAN designations through network administrator action.

FIG. 3 is a highly schematic illustration of a VLAN vector 300. Vector 300 is preferably organized at least logically as a table or array having a plurality of columns and rows whose intersections define records or cells for storing information. In particular, vector 300 has a VLAN column 302 for storing VLAN numeric identifiers (IDs), e.g., 0 through 4095, an STP state column 304 for storing the port's spanning tree state for the respective VLAN ID, a current wanted column 306 and a waiting wanted column 308 whose contents are described in more detail herein. VLAN vector 300 further includes a plurality of rows 310a-t, i.e., one row per VLAN numeric ID. Each column 302-308 of the VLAN vector 300 may be considered to be a separate vector, e.g., column 302 may also be considered the port's VLAN vector, column 304 may be considered the port's STP state vector, etc.

The VLAN vector 302 is preferably at least 12-bits wide to, accommodate all 4096 possible VLAN designations. The STP state vector 304 is preferably 2-bits wide to accommodate four possible spanning tree port states: disable, blocking/listening, learning and forwarding. The current wanted and waiting wanted vectors 306 and 308 are preferably each 1-bit wide. Those skilled in the art will recognize that the VLAN vector 300 may be other sizes and/or may include other columns or fields.

In the preferred embodiment, the VPP port logic circuits 244 are implemented in hardware through a plurality of registers and combinational logic configured to produce sequential logic circuits and cooperating state machines, such as through one or more specially designed Application Specific Integrated Circuits (ASICs). The VPP switch entity 240 is preferably implemented through one or more software modules or libraries containing program instructions pertaining to the methods described herein and executable by one or more processing elements, such as a network processor (not shown) of switch 214. Other computer readable media may also be used to store and execute these program instructions. Nonetheless, those skilled in the art will recognize that various combinations of software and hardware, including firmware, may be utilized to implement the present invention.

VLAN Pruning Protocol (VPP)

Operation of the present invention preferably proceeds as follows. First, the network administrator preferably associates selected access ports of the switches with one or more VLAN designations. This may be accomplished either locally to the switch through a Command Line Interface (CLI) or remotely using an existing device configuration protocol, such as Simple Network Management Protocol (SNMP). Suppose, for example, that the following VLANs, among others, are established within the bridged network 100 (FIG. 1): VLAN numeric ID "9", which corresponds to the Red (R) VLAN, VLAN numeric ID "4087", which corresponds to the Green (G) VLAN, and VLAN numeric ID "4091", which corresponds to the Blue (B) VLAN.

Next, the switches 120-134 execute a spanning tree protocol to define one or more active topologies within the bridged network 100. In the preferred embodiment, the switches execute one of the spanning tree protocols described in the IEEE 802.1 Q specification standard, the IEEE 802.1s draft specification standard or the per-VLAN Spanning Tree Protocol from Cisco Systems, Inc. Suppose also that switch 120 is elected the root of either the single active topology under 802.1Q or of one or more active topology(ies) under the 802.1s draft specification standard for the Red (R), Blue (B) and Green (G) VLANs. As each port (P) of switch 122 transitions among the spanning tree states, e.g., blocked, listening, learning and forwarding, the current spanning tree state for each VLAN is stored at the port's VLAN vector 300. Specifically, VPP port logic 244 stores the current spanning tree port state, e.g., forwarding, for the Red VLAN for port P0 at the STP state column 304 cell matching row 310*j*, which corresponds to VLAN numeric ID "9". The VPP port logic 244 similarly stores the current spanning tree port state associated with the other VLANs, e.g., for the Blue and Green VLANs, for port P0. The VPP port logic circuits 244 at the other ports P1-P3 similarly store the current spanning tree port state associated with each VLAN for those ports.

As part of the initialization process of each trunk port logic circuit 214-218, the current wanted and waiting wanted columns 306 and 308 of the port's VLAN vector 300 are preferably initialized to a predetermined state. Specifically, the current wanted column or vector 306 is initialized to an asserted state, e.g., set to "1", while the waiting wanted column or vector 308 is initialized to a de-asserted state, e.g., set to "0". The collecting flag 241 is also initialized to a de-asserted state, e.g., set to "0".

In accordance with the present invention, the each root bridge of network 100 is configured to periodically issue VPP control packets from its trunk ports. More specifically, upon its election as the root bridge, the switch's spanning tree protocol entity 230 notifies the VPP switch entity 240 of its election. It should be understood that, as all bridges initially presume themselves to be the root upon start-up, the spanning tree protocol entity 230 preferably waits some predetermined time before informing the VPP switch entity 240 of its election.

Assuming switch 120 is elected the root and so notifies the VPP switch entity 240, entity 240 is configured to generate and broadcast VPP control packets from each trunk port of switch 120 that identifies the switch's VLAN membership information. A switch is considered to be a member of each VLAN designation that has been associated with at least one of the switch's access ports. Suppose, for example, that one or more access ports (not shown) at switch 120 have been associated with the Red, Blue and Green VLANs. Depending on their destination Media Access Control (MAC) addresses, network messages tagged with any of these VLAN IDs may be forwarded to switch 122.

It should be understood that VPP does not override normal bridge forwarding decisions based on destination MAC address. Instead, VPP suppresses broadcasts, multicasts and those unicast messages that are flooded, e.g., because their destination MAC addresses are unknown.

In the preferred embodiment, VPP control packets are not forwarded from access ports.

Figure 4:
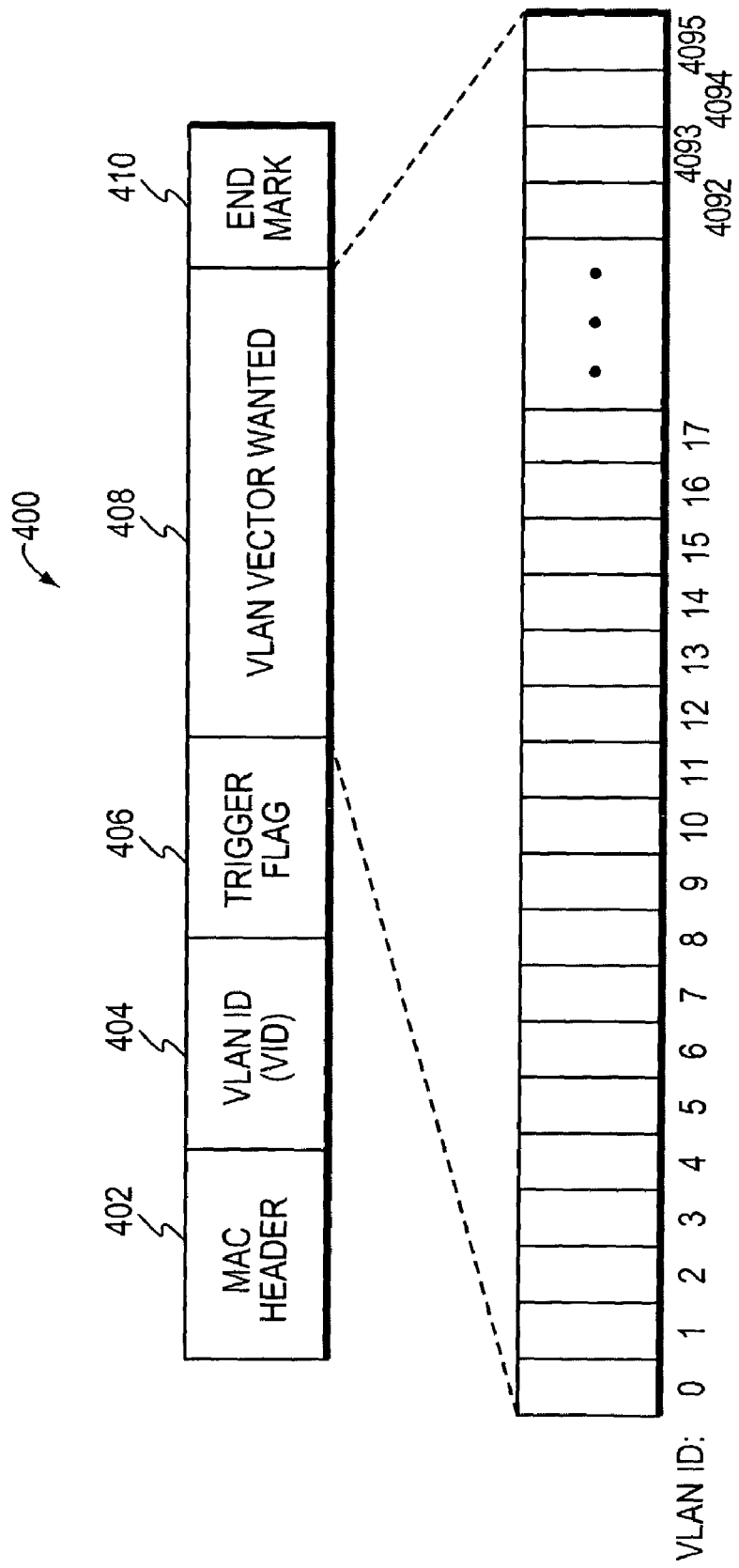
FIG. 4 is a highly schematic illustration of a control packet in accordance with the present invention.

FIG. 4 is a highly schematic illustration of a VPP control packet 400 as generated by the message generator 424 of VPP switch entity 240. Control packet 400 includes a header 402 that is preferably compatible with the MAC sub-layer being utilized in network 100. In particular, the MAC header 402 includes MAC destination and source addresses and may include a VLAN header, such as the VLAN header specified by the IEEE Std. 802.1Q-1998 specification standard. The VPP control packet 400 further includes a protocol identifier field (not shown), such as an EtherType field for packets in conformance with the Ethernet standard, that is set to identify the packet as a VPP control packet, a 1-byte VLAN ID (VID) field 404 so that the packet 400 can be tagged with a selected VLAN, a trigger flag field 406, which is preferably a 1-bit flag, a VLAN vector wanted field 408, which is preferably 4096-bits and an end mark 410, which identifies the end of the control packet 400. The MAC header 402 preferably includes a destination address (DA) field (not shown) and a source address (SA) field (not shown), among others. The DA field is preferably loaded with a selected bridge multicast address, such that the VPP control packet 400 is accepted by all switches running the VLAN Pruning Protocol of the present invention. As indicated in FIG. 4, each bit of the VLAN vector wanted field 408 preferably corresponds to a respective VLAN numeric ID. For example, the first bit of the VLAN vector wanted field 408 preferably corresponds to VLAN ID "0", the second bit corresponds to VLAN ID "1", the third bit corresponds to VLAN ID "2", and so on.

It should be understood that VPP control packet 400 may include more or fewer fields, for example, the VID field 404 could be omitted. The packet 400 may also take other forms.

Assuming switch 120 is the root bridge of the single active topology defined in accordance with the IEEE 802.1Q specification standard, the message generator 242 asserts, e.g., sets to "1", the trigger flag 406 of the VPP control packet 400 that it generates. The message generator 242 also asserts each bit of the VLAN vector wanted field that corresponds to a VLAN designation that has been associated with at least one access port of switch 122. As the access ports of switch 122 have been associated with the Red, Blue and Green VLANs, message generator 242 asserts the 10th-bit (for the Red VLAN), the 4086th bit (for the Green VLAN) and the 4090th-bit (for the Blue VLAN) of the VLAN vector wanted field 408. The VPP switch entity 240 then sends the VPP control packet to each trunk port for transmission into the bridged network 100.

Figure 5:
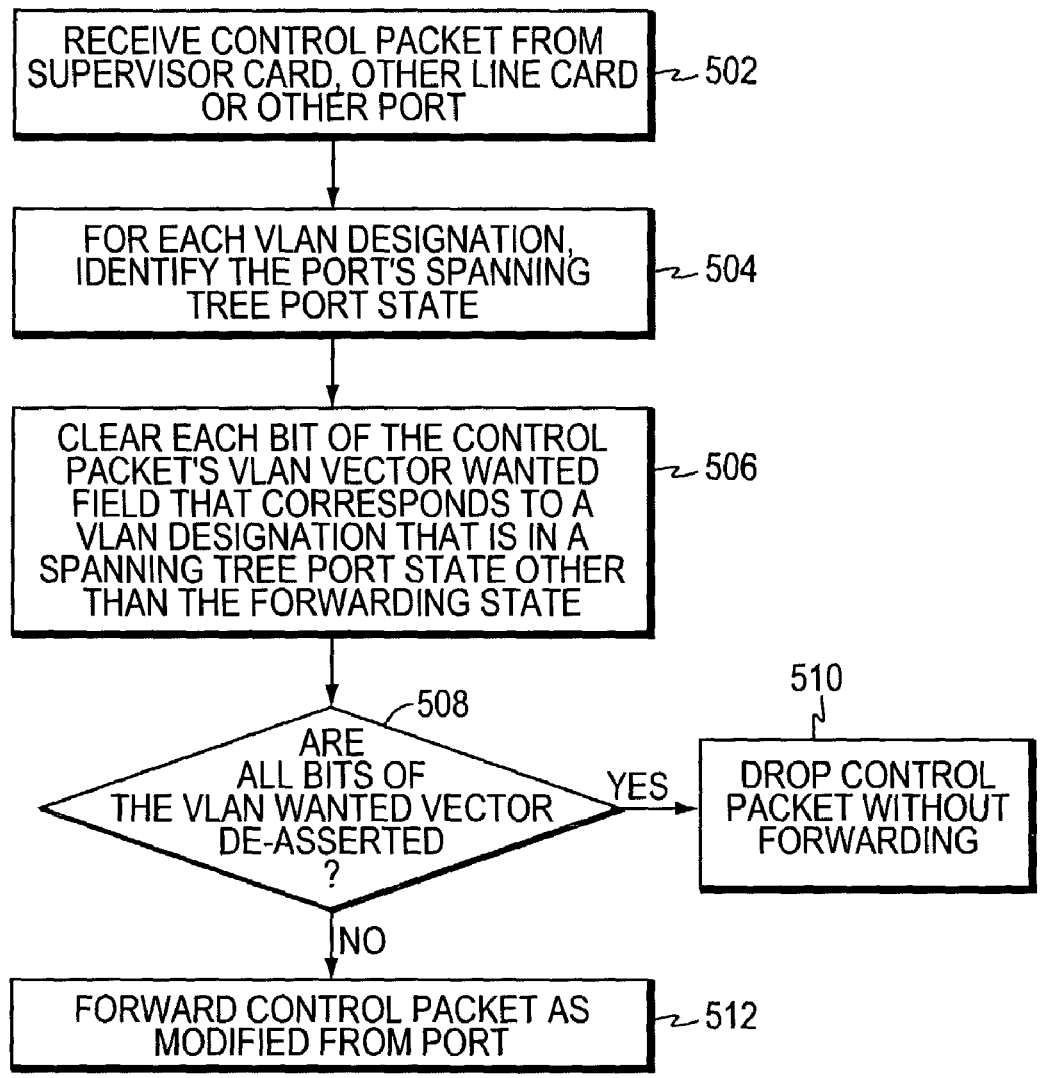
FIGS. 5 and 6 are flow diagrams of methods of the present invention.

FIG. 5 is a flow diagram of the steps performed by each port in response to receiving a VPP control packet 400. As indicated at block 502, the VPP control packet 400 is received at a given port logic circuit. In this case, the VPP control packet 400 is received from the switch's supervisor card 202. The received VPP control packet 400 is examined and modified as necessary by the VPP port logic circuit 244 before transmission from the respective port. Specifically, as indicated at block 504, the message analyzer 246 accesses the port's VLAN vector 300 and examines the current STP state as reflected in the contents of the STP state vector 304 for each VLAN designation. The message analyzer 246 then clears or de-asserts each bit of the VLAN vector wanted field 408 included within the received VPP control packet 400 if the corresponding STP state is in anything other than the forwarding spanning tree state, e.g., disabled, blocking, listening or learning, as indicated at block 506. For example, if the green VLAN is in a state other than forwarding, the 4087th bit of the VLAN vector wanted field 408 (which corresponds to the green VLAN) is de-asserted. The message analyzer 246 next determines whether all of the bits of the packet's VLAN vector wanted field 408 are de-asserted, as indicated by decision block 508. If so, the VPP control packet 400 is preferably discarded without being forwarded from the respective port, as indicated at block 510.

Assuming there are at least two bits of the VLAN vector wanted field 408 that are still asserted, the VPP control packet 400 is forwarded from the respective port, as indicated at block 512. The VPP control packet 400 is preferably transmitted without any VLAN designation loaded into the VID field 404. The special case in which only a single bit of the VLAN vector wanted field 408 remains asserted is described below.

This process of analyzing the VPP control packet 400 received from the VPP switch entity 240 and modifying the VLAN vector wanted field 408 prior to transmission is repeated at each of the other trunk ports, if any, of switch 122. As switch 120 is coupled to switches 122 and 128 via LAN 102, the VPP control packet forwarded from port 150 of switch 120 is received by both switch 122 and switch 128. In particular, the VPP control packet is received at port P0 of switch 122.

Figure 6A:
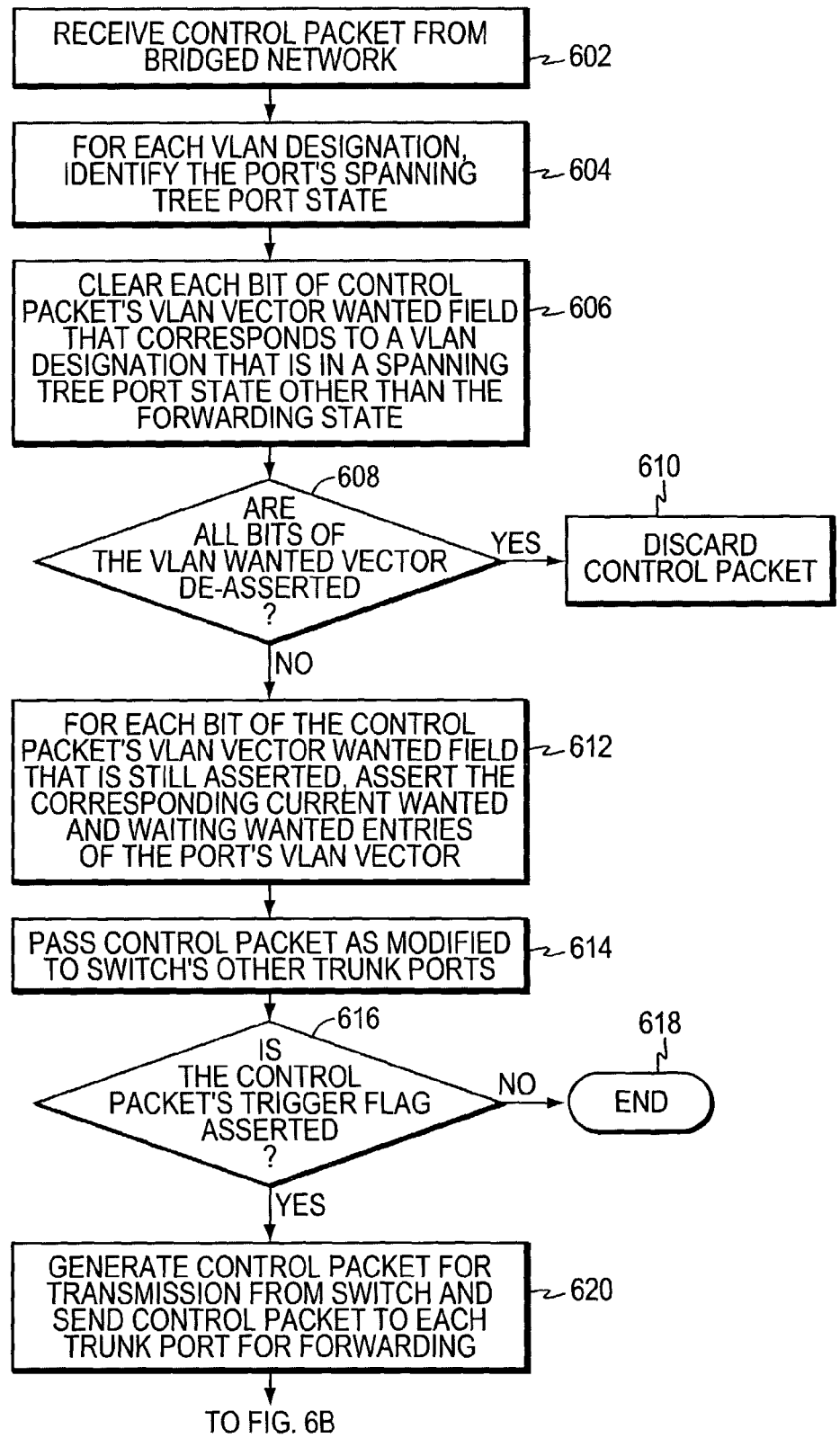
Figure 6B:
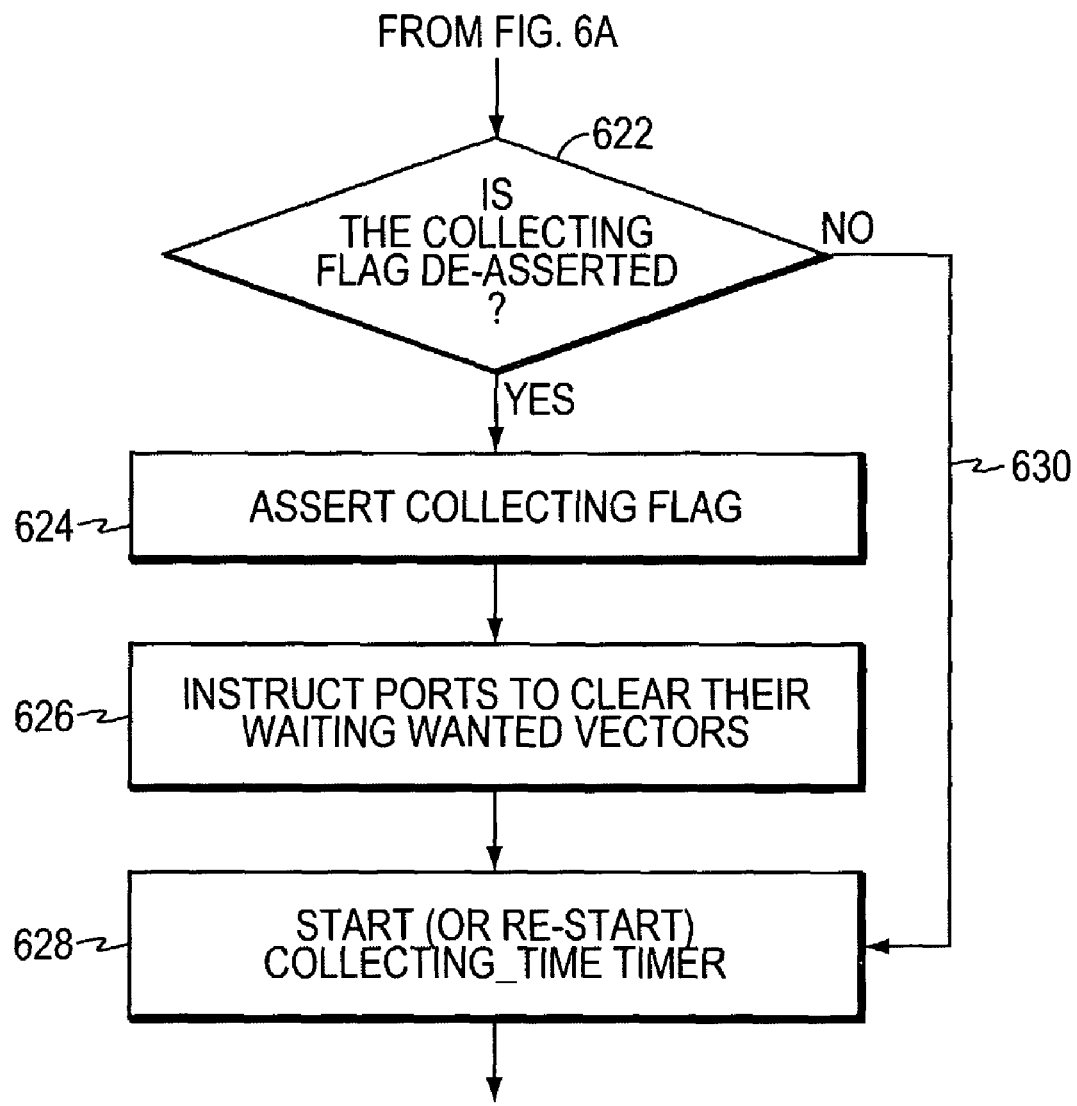

FIGS. 6A and 6B are a flow chart of the steps performed by a port in response to receiving a VPP control packet 400 from the bridged network 100. As indicated at block 602 (FIG. 6A), the control packet 400 is first received by the port. The VPP port logic 244 preferably processes the received VPP control packet 400 as follows. Specifically, the message analyzer 246 accesses the port's VLAN vector 300 to determine the current spanning tree state of the port for each VLAN designation, as indicated at block 604. The message analyzer 246 then clears or de-asserts any bit within the received control packet's VLAN wanted vector field 408 whose corresponding VLAN is in a spanning tree port state other than forwarding, as indicated at block 606. Suppose, for example, that the green VLAN is blocking at P0 of switch 122. In this case, the message analyzer de-asserts the 4087th bit which corresponds to the green VLAN. Next, the message analyzer 246 determines whether all of the bits of the packet's VLAN vector wanted field 408 are de-asserted, as indicated by decision block 608. If so, the received VPP control packet 400 is discarded and no further processing takes place, as indicated at block 610.

Otherwise, for each bit of the control packet's VLAN vector wanted field 408 that remain asserted, the message analyzer 246 asserts the cells of both the current wanted column 306 and the waiting wanted column 308 of the VLAN vector 300 corresponding to these VLANs, as indicated at block 612. That is, the message analyzer 246 accesses each row 310 of the port's VLAN vector 300 that corresponds to a VLAN designation whose VLAN vector wanted bit is still asserted. For each such row, the message analyzer 246 asserts the entries for both the current wanted and waiting wanted vectors 306 and 308 for that row.

The received VPP control packet 400 as modified (or not as the case may be) by the message analyzer 246 is then passed on to the other trunk ports of switch 122 and to the supervisor card 202, as indicated at block 614. In particular, the control packet 400 is placed on the local bus 222 for receipt by the other port logic circuits, e.g., port logic circuit 216, if any, disposed on the same line card, and for receipt by the line card's U/D link 212 which drives the control packet onto message bus 208. From message bus 208, the control packet is received at the other port logic circuits that have been configured as trunk ports as well as at the supervisor card 202.

The other port logic circuits process the received control packet as described above in connection with the flow chart of FIG. 5. At the supervisor card 202, the VPP switch entity 240 determines whether the trigger flag 406 of the received VPP control packet 400 is asserted, as indicated at decision block 616. If not, the VPP switch entity 240 performs no further actions and discards the control packet 400, as indicated by end block 618. On the other hand, if the trigger flag 406 is asserted, then the VPP switch entity 240 directs the message generator 242 to formulate a VPP control packet 400 of its own for transmission from the trunk ports of switch 122, as indicated at block 620. Unlike the received VPP control packet, however, the control packet generated by the message generator 242 of switch 122 does not have its trigger flag 406 asserted. That is, receipt of a VPP control packet 400 with its trigger flag 406 asserted causes the receiving switch to generate and send its own VPP control packets.

The VPP switch entity 240 next determines whether its collecting flag 241 is de-asserted, e.g., set to "0", as indicated by decision block 622 (FIG. 6B). If so, the VPP switch entity 240 asserts, e.g., sets to "1", its collecting flag 241, as indicated at block 624, and instructs each VPP port logic 244 to de-assert or clear the contents of its waiting wanted vectors 308, as indicated at block 626. The VPP switch entity 240 also starts a COLLECTING_TIME timer 243 (FIG. 2), as indicated at block 628. If the collecting flag 241 was already asserted, then the VPP switch entity 240 simply re-starts the COLLECTING_TIME timer 243, as indicated by No arrow 630.

This process is repeated at each of the switches of the bridged network 100. The VPP control packet 400 created by root bridge 120 is thus forwarded, perhaps with modifications, to every other switch in the bridged network 100. In particular, the VPP control packets travel along the active topology(ies) defined within the bridged network 100. The receiving switches also use the information from the VLAN vector wanted field 408 of the received VPP control packets 400 to set the contents of their current wanted and waiting wanted vectors 306 and 308.

By virtue of the root bridge, i.e., switch 120, asserting the trigger flag 406 of its VPP control packets 400, the receiving switches also generate and sent VPP control packets 400 of their own. Thus, VPP control packets 400, which advertise the transmitting switch's VLAN membership profile, are periodically broadcast throughout the bridged network 100 by all switches, including the root bridge(s). The contents of the VPP control packet 400 transmitted from each port is modified, moreover, to advertise only those VLANs for which the respective port is in the forwarding spanning tree port state. In addition, the receipt of VPP control packets 400 causes the respective port to set the contents of its VLAN vector 300.

It may be seen that the de-asserting or clearing of wanted vector bits 408 in VPP control packets 400 by the STP state vector 304 in each port prevents information about a given VLAN from propagating except along the active topology of the spanning tree controlling that VLAN. The suppression of a VPP control packet 400 when its, wanted vector 408 becomes 0 prevents the endless looping of VPP control packets 400.

The contents of VLAN vectors 300 are also set in response to the receipt of a VLAN-tagged data frame at a port. Specifically, if a port logic circuit receives a data frame (other than a control frame, such as a BPDU), that is tagged with a given VLAN, and the spanning tree port state associated with the given VLAN is in either the learning or the forwarding states, as reflected in the port's VLAN vector 300, the message analyzer 246 checks to see whether the VLAN vector's current wanted 306 and waiting wanted 308 entries for the given VLAN are also set. If they are not, the message analyzer 246 sets both the current wanted and waiting wanted entries for the given VLAN.

The contents of the VLAN vector 300 are used to determine whether a data packet associated with a given VLAN is to be forwarded from a selected port. In particular, as described in commonly owned U.S. Pat. No. 5,764,636, titled Color Blocking Logic Mechanism for a High-Performance Network Switch, which is hereby incorporated by reference in its entirety, a frame associated with a given VLAN is forwarded from a selected port provided that the port's spanning tree state for the given VLAN is in the forwarding state. In accordance with the present invention, the port logic circuits make a further determination before forwarding a frame. In particular, the port logic circuits also determine whether the current wanted entry of the port's VLAN vector 300 corresponding to the given VLAN is also set. If it is, the packet is forwarded by the port. If the current wanted entry is not asserted, the packet is dropped or discarded even though the spanning tree state for the given VLAN may be in the forwarding state.

Figure 7:
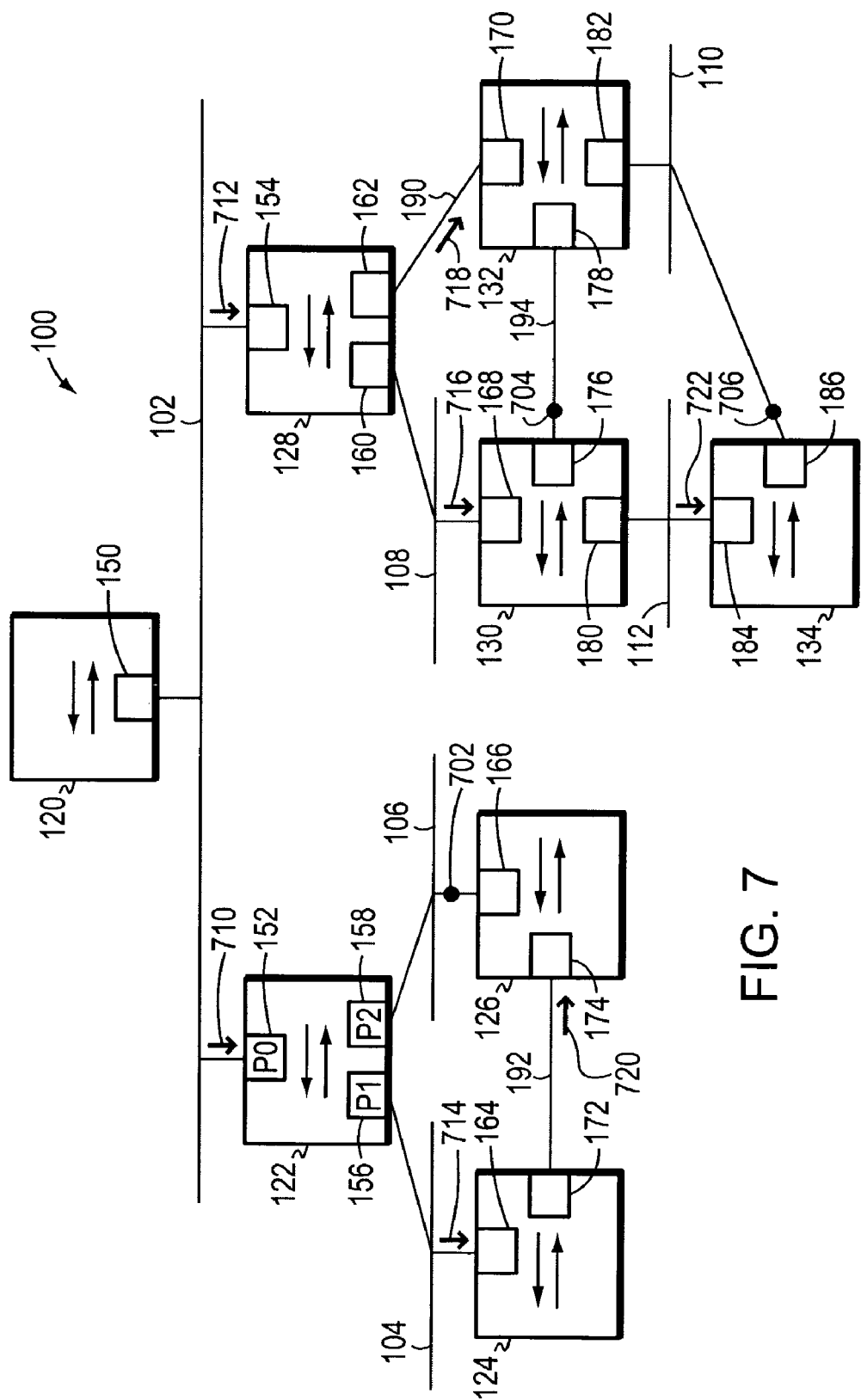
FIGS. 7 and 8 are highly schematic diagrams of the computer network of FIG. 1.

FIG. 7 is a highly schematic illustration of the bridged network 100 from FIG. 1 upon convergence of the spanning tree protocol. The loops existing in the bridged network 100 have been severed resulting a loop-free active topology. For example, as indicated by dots 702-706, port 166 of switch 126, port 176 of switch 130 and port 186 of switch 134 are all blocking. Arrows 712-722 illustrate the receipt of the VPP control packets 400 sourced from the root bridge 120 and received at each of the bridges of the network 100. Suppose the arrows 712-722 represent VPP control packets advertising the red VLAN designation. As shown, the VPP control packet 400 is not received on ports that are in the blocking spanning tree state, such as ports 166, 176 and 186.

Figure 8:
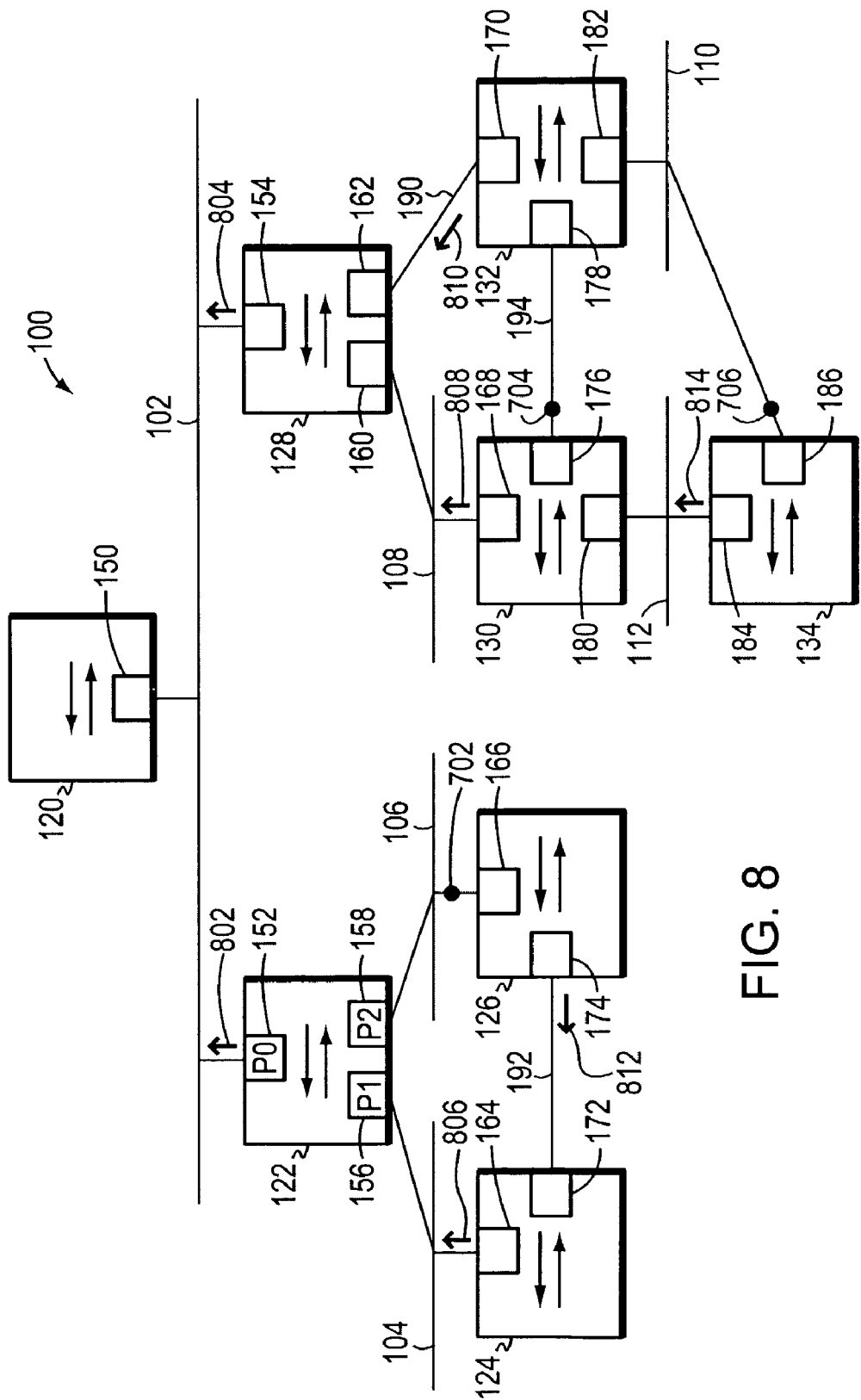

FIG. 8 is a highly schematic illustration of the bridged network 100 of FIG. 7. Arrows 802-814 have been added to illustrate the modifications to the port's VLAN vectors 300 in response to the VPP control packet from root bridge 120 advertising the red VLAN designation. The arrows represent the trunk port(s) from which a switch will forward a data frame tagged with the red VLAN received by the switch. That is, for each port that received a VPP control packet from the root 120 advertising the red VLAN, an arrow in the opposite direction illustrates how frames tagged with the red VLAN may be forwarded. Suppose switch 122 receives a broadcast data frame on one of its access ports associated with the red VLAN designation. As only trunk port P0 has the red VLAN designation asserted in its current wanted vector 306 (as represented by arrow 802), the data frame is forwarded only from this port, even if trunk ports P1 and P2 are in the forwarding spanning tree state for the red VLAN. This way, switches 124 and 126, which do not have any ports associated with the red VLAN designation in this example, do not receive the message. The present invention thus conserves network bandwidth by blocking frames tagged with a given VLAN from entering portions of the bridged network that have no access ports associated with the given VLAN designation.

As indicated above, all entries of the current wanted vector 306 are initially asserted. This effectively nullifies the current wanted vector's effect on the forwarding of data frames from the port. In other words, with all entries asserted, the current wanted vector 306 will cause no frames to be blocked. The waiting wanted vector 308 is initially de-asserted, and is also de-asserted after the first trigger-type VPP control packet is received following a predetermined period of time, as indicated by block 626 (FIG. 6B). As described above, the entries of both the current wanted vector 306 and the waiting wanted vector 308 are asserted in response to the receipt of VPP control packets from other switches and the receipt of tagged data frames. When the COLLECTING_TIME timer 243 expires, which means no trigger-type VPP control packets have been received within that time period, the VPP switch entity 240 directs one or more (preferably all) VPP port logic circuits 244 to strobe the contents of its waiting wanted vector 308 into its current wanted vector 306. From this point forward, the state or contents of the current wanted vector 306 will have an effect on the forwarding of data frames from the port, as some of the entries will be de-asserted. The VPP switch entity 240 also de-asserts or clears the collecting flag 241 on expiration of the COLLECTING_TIME timer 243.

As indicated above, the VPP switch entity 240 of the root bridge generates and issues VPP control packets on a periodic basis. Specifically, the VPP switch entity 240 is configured to generate and send VPP control packets having their trigger flag 406 asserted every TRIGGER_TIME, which is preferably a settable parameter at the VPP switch entity 240. In the preferred embodiment, the TRIGGER_TIME is on the order of 600 seconds, i.e., ten minutes. In addition, the VPP switch entity 240 preferably generates and sends to the line cards more than one VPP control packet for transmission through the bridged network 100 every TRIGGER_TIME. For example, the VPP switch entity 240 preferably issues NUMBER_TRIGGERS, e.g., three, of VPP control packets every TRIGGER_TIME, which is also a settable parameter. The VPP control packets 400 issued during a given TRIGGER_TIME are separated by a preset time, which is referred to as the TRIGGER_INTERVAL. A suitable TRIGGER_INTERVAL is on the order of 0.5 seconds.

In addition to being periodically issued as determined by the root bridge(s), VPP control packets 400 are also issued by other bridges including the root(s) at their own initiative. Specifically, the VPP switch entity 240 and VPP port logic circuits 214 are configured to generate and issue VPP control packets in response to particular events.

Adding/Removing a VLAN Membership from a Switch

Suppose, for example, that the network administrator re-configures a switch, such as switch 122, by adding a new VLAN membership to the switch 122. For example, the network administrator may configure a new port (access or trunk) at the switch and associate this new port with a VLAN designation that, before now, has not been associated with any other port of switch 122. Or, the network administrator may associate an existing port at switch 122 with a new VLAN designation. As indicated above, each port preferably stores its VLAN membership information in the port VLAN configuration memory 248. The VPP port logic circuits 244 are programmed to notify the VPP switch entity 240 through one or more command messages whenever the port's port VLAN configuration memory 248 is modified. In response, the message generator 242 formulates one or more VPP control packets 400 to be broadcast across the bridged network 100 so that the other bridges will learn of the addition of the new VLAN designation at switch 122. Preferably, the trigger flag 406 of each VPP control packet generated by switch 122 is de-asserted. The VPP control packet 400 is then delivered from the VPP switch entity 240 to the VPP port logic circuit 244 of each trunk port. Each VPP port logic circuit 244 processes and forwards the VPP control packet 400 into the bridged network 100 as described above in connection with FIG. 5.

Receipt of these VPP control packets 400 from switch 122 causes the trunk ports of the other switches of the bridged network 100 to update their VLAN vectors 300 as described above in connection with FIGS. 6A and 6B. As the trigger flag 406 is de-asserted, the VPP control packets 400 from switch 122 do not cause the other switches of the bridged network 100 to generate their own VPP control packets 400.

Suppose the network administrator re-configures a switch, such as switch 122, to remove an existing VLAN designation from the switch. For example, suppose that the network administrator re-configures all of the ports at switch 122 that were originally associated with the blue VLAN designation such that none of these ports are associated with the blue VLAN designation. Again, the VPP switch entity 240 is notified of such changes and, in response, the message generator 242 formulates one or more VPP control packets 400 to be broadcast across the bridged network 100 so that the other bridges will learn of the deletion of the existing VLAN designation from switch 122. The message generator 242 sets the control packet's VLAN vector wanted field 408 to identify all VLAN designations to which one or more ports are associated. As no port is currently associated with the blue VLAN, the 4091st bit of the VLAN vector wanted field 408, which corresponds to the blue VLAN designation, is left de-asserted. Preferably, the trigger flag 406 is asserted. In response to generating a VPP control packet 400 with its trigger flag 406 asserted, the VPP switch entity 240 also asserts its collecting flag 241, instructs the ports to clear their waiting wanted vectors 308, and starts its COLLECTING_TIME timer 243, assuming the collecting flag 241 was in the de-asserted state, as described above in connection with FIG. 6B. If the collecting flag 241 was already asserted, the VPP switch entity 240 simply re-starts the COLLECTING_TIME timer 243.

A suitable value for the COLLECTING_TIME is on the order of two seconds.

The VPP control packet 400 is then delivered from the VPP switch entity 240 to each VPP port logic circuit 244. Each VPP port logic circuit 244 processes and forwards the VPP control packet into the bridged network 100 as described above in connection with FIG. 5. Receipt of these VPP control packets from switch 122 causes the trunk ports of the other switches of the bridged network 100 to update their VLAN vectors 300 as described above in connection with FIG. 6. Furthermore, as the trigger flag 406 is asserted, the VPP control packets 400 from switch 122 also cause the other switches of the bridged network 100 to generate and broadcast their own VPP control packets 400. If it is the first trigger-type VPP control packet that has been received in a while, e.g., since the COLLECTING_TIME timer last expired, the switch also asserts its collecting flag, clears its waiting wanted vectors 308 and starts its COLLECTING_TIME timer.

Transitioning Ports Among Spanning Tree Port States

VPP control packets 400 are also issued in response to ports transitioning among spanning tree port states. Suppose, for example, that execution of the spanning tree protocol at a switch, such as switch 122, results in a given port, e.g., P2, transitioning to the forwarding state. The VPP switch entity 240 preferably monitors or is otherwise notified of such spanning tree state changes at the switch's ports. In response to a port moving to the forwarding state, the VPP switch entity 240 directs the message generator 242 to formulate one or more VPP control packets 400 to be broadcast across the bridged network 100. The trigger flag 406 of such VPP control packets is preferably asserted. As port P2 of switch 122 is now in the forwarding state, the VPP control packet 400 will be forwarded from this port as well.

The VPP switch entity 240 also monitors or is notified if a port, such as port P1, transitions out of the forwarding state and into any other spanning tree port state. In response, the VPP switch entity 240 preferably starts a timer, such as a DOWN_TIMER. If the VPP switch entity 240 receives a VPP control packet 400 having its trigger flag 406 asserted before the expiration of the DOWN_TIMER, then, as described above, the VPP switch entity 240 generates and issues one or more VPP control packets 400 of its own, and no action is taken in response to port P1 having transitioned out of the forwarding state. In other words, the VPP switch entity 240 relies on the VPP control packets 400 that are sent in response to having received a VPP control packet 400 with its trigger flag 406 asserted to inform the other bridges of the change caused by port P1 transitioning out of the forwarding state. Because P1 is no longer in the forwarding state, VPP control packets 400 are not sent from this port.

If the DOWN_TIMER expires without switch 122 having received any VPP control packets with the trigger flag 406 asserted, the VPP switch entity 240 directs the message generator 242 to formulate one or more VPP control packets 400 with the trigger flag 406 asserted. The VPP control packet 400 is then provided to each port logic circuit for forwarding into the bridged network 100, as described in connection with FIG. 5.

As shown, with the present invention, switches broadcast VPP control packets 400 from their trunk ports and these VPP control packets are modified, as necessary, before being forwarded by the other switches of the bridged network 100. If the VLAN Vector Wanted 408 is modified such that its contents are reduced to zero, then packet is dropped, otherwise it is forwarded. In the illustrative embodiment, several techniques are utilized to minimize or reduce the impact such control messages have on the network's bandwidth. For example, if a switch in the process of issuing a series of VPP control packets 400 with the trigger flag 406 asserted, receives a VPP control packet 400 with its trigger flag 406 asserted a predetermined time before issuing one of the VPP control packet's in its series, the VPP switch entity 240 preferably responds to the received VPP control packet 400 with a single VPP control packet of its own that does not have the trigger flag asserted. The VPP switch entity 240 also skips the next VPP control packet that it would otherwise send in its set of VPP control packets. The predetermined time is preferably TRIGGER_INTERVAL*1.5.

In addition, after sending a VPP control packet having its trigger flag de-asserted as well as after sending the last VPP control packet of a series having its trigger flag asserted, the VPP switch entity 240 preferably starts a HOLDDOWN timer. If the VPP switch entity 240 receives a VPP control packet 400 with the trigger flag asserted before the HOLDDOWN timer expires, the VPP switch 240 entity does not respond with any VPP control packets of its own.

If the HOLDDOWN timer expired by the time the VPP control packet 400 is received, the VPP switch entity 240 preferably starts a random timer. When the random timer expires, the switch transmits its VPP control packet(s) 400. This prevents the switches of the network from issuing their VPP control packets 400 simultaneously (or near simultaneously) into the network. The random timer is preferably configured so that its output does not exceed an upper limit, which may be referred to as WANTED_JITTER, and may be on the order of 400 milliseconds.

A suitable setting for the HOLDDOWN timer is approximately five seconds. The HOLDDOWN timer and WANTED_JITTER threshold may be specified in the VPP control packets 400 issued by the root(s).

In accordance with the present invention, if a port after performing its processing of a VPP control packet 400 to be transmitted by the port determines that only a single bit of the packet's VLAN vector wanted field 408 remains asserted, the VPP port logic 244 preferably removes the VLAN vector wanted field 408 from the control packet 400. The VPP port logic then loads the VID field 404 with the VLAN designation that corresponds to the one bit of the VLAN vector wanted field 408 that would otherwise be asserted. Switches receiving VPP control packets 400 having no VLAN vector wanted field 408 are configured to examine the packet's VID field 404 and treat its contents as the one advertised VLAN. This substantially reduces the size of the resulting VPP control packet 400, conserving network bandwidth.

As shown, every TRIGGER_TIME as well as in response to certain network events, such as removing an existing VLAN from a port or transitioning a port to the forwarding state, the bridges or switches of the network enter into a collecting session. During the collecting session, the switches first clear their waiting wanted vectors 308. The switches then broadcast VPP control packets 400 causing them to update their waiting wanted vectors 308 and their current wanted vectors 306, i.e., they "collect" VLAN membership information. Some time after the last trigger-type VPP control packets have been issued, e.g., upon expiration of the COLLECTING_TIME, the switches strobe the contents of the waiting wanted vectors 308 into the current wanted vectors 306, thereby bringing the current wanted vectors 306 up-to-date. In other words, with the present invention, the current wanted vectors 306 are never cleared themselves. In addition, the collecting sessions do not occur more often than every HOLDDOWN time.

As an optimization, some switches may be configured to drop received VPP control packets without processing them. In particular, an "edge bridge" is defined as a bridge or switch that normally has only a single trunk port enabled and in the forwarding state for any given VLAN at any given time. An edge bridge does not convey data frames from one trunk to another. As each tagged data packet being transmitted from the edge bridge has only a single trunk port from which to choose, it is unnecessary to prune outgoing data frames. Accordingly, the network administrator preferably configures all of the edge bridges within the network to discard without processing any received VPP control packets 400. The trunks of the edge bridges, moreover, are configured or programmed to pass all VLAN designations. That is, the trunk ports have all bits of their current wanted vectors 306 asserted, e.g., set to "1". Furthermore, the edge bridge do respond to VPP control packets that have their trigger flags 406 asserted with VPP control packets of its own. The edge bridge also generates VPP control packets in response to the addition/deletion of VLAN associations at the edge bridge and/or to the transition of ports into and out of the forwarding state, as described above.

Interoperation with Grouped Ports

Several technologies exist for grouping multiple physical ports into a single logical port. For example, IEEE Std. 802.3-2000, clause 43, Link Aggregation, as well as EtherChannel and Fast EtherChannel from Cisco Systems, Inc. of San Jose, Calif. refer to a technology that can be used to bundle individual Ethernet links into a single logical link. In addition, the Port Aggregation Protocol (PAgP) also from Cisco Systems, Inc. and described in U.S. Pat. No. 5,959,968 can automatically detect the existence of multiple physical links between two neighboring switches and aggregate them into a single logical link.

In the case of such logically grouped ports, only a single port of the group is selected to transmit VPP control packets 400 in accordance with the present invention. Any suitable selection criteria may be used to select the single port on which to send the VPP control packets, such as highest (or lowest) port number.

Interoperation with Legacy Devices

An existing network may include one or more bridges that execute the GARP VLAN Registration Protocol (GVRP), the VLAN Trunk Protocol (VTP) from Cisco Systems, Inc. or no VLAN pruning technique at all. The VLAN Pruning Protocol (VPP) of the present invention is preferably implemented to cooperate with all three types of legacy bridges. Specifically, VLAN membership information received by a VPP-aware switch from a neighbor switch that is running GVRP or VTP is preferably incorporated into the VPP control packets generated and transmitted by the VPP-aware switch. More specifically, the received VLAN membership information is passed from the ports to the supervisor card 202 and is received at the VPP switch entity 240, which may store this information at memory 232. The information is then utilized by the VPP control message generator 242 when it formulates VPP control packets for transmission from the VPP-aware switch.

A bridge that acts as a transit bridge for tagged data frame but does not perform any VLAN pruning functions, requires special handling. In particular, neighboring VPP-aware transit bridges are preferably configured to add any VLANs required by the non-pruning transit bridge to the VPP control packets 400 issued by the neighboring VPP-aware transit bridge. Neighboring GVRP and VTP bridges should similarly add any VLANs required by the non-pruning transit bridge to the VLAN membership information transmitted by those bridges. If this cannot be done, then the neighboring bridges should be configured to operate in GVRP permissive mode (e.g., "favors sending") with respect to the non-pruning transit bridge. VPP-aware edge bridges may operate normally, as described above, as all HVPP packets will simply be transmitted through the non-pruning transit bridge.

It should be understood that the VLAN Pruning Protocol (VPP) of the present invention may be implemented or activated at a selected switch on a port-by-port basis. That is, some ports of the selected switch may participate in VPP while others do not. The non-VPP ports may run a software based VLAN pruning technique such as the GARP VLAN Registration Protocol (GVRP) or the VLAN Trunk Protocol (VTP) from Cisco Systems, Inc. A given port, however, must not be configured to run both VPP and a software based VLAN pruning technique. In order for a multi-protocol switch to generate the appropriate GVRP or VTP pruning packets, the supervisor card 202 must poll each of the VPP enabled ports to collect a list of VLANs needed by its neighbors. That is, a list that includes not only the ports' configured VLAN requirements, but also VLANs accessible in the spanning tree under the bridge. In the illustrative embodiment, each VPP enabled port further includes a Current Wanted Changed bit or flag (not shown). The VPP port logic 244 preferably sets the Current Wanted Changed flag whenever any bit in the Current Wanted vector 306 changes, either as a result of a received data packet, a received VPP control packet 400, or as a result of strobing the Waiting Wanted vector 308 into the Current Wanted vector 306. Assertion of the Current Wanted Changed flag indicates that new VLAN membership information must be relayed to the GVRP or VTP entities at the supervisor card 202. If the Current Wanted Changed bit is not asserted, the Current Wanted vector 306 need not be examined. Upon transmission of the updated Current Wanted vector 306, the Current Wanted Changed flag is preferably cleared.

A VPP-aware switch is preferably configured to hold off on transmitting GVRP or VTP packets from a port until after control messages corresponding to those solutions have been received on the port. As VPP control packets 400 are broadcast through the network, receipt of a VPP control packet does not necessarily mean that the neighboring bridge port is running VPP. To determine whether a neighboring bridge port is running VPP, a VPP-aware bridge could compare the source MAC address of received configuration bridge protocol data unit (BPDU) messages with the source MAC address of received VPP control packets 400. Those skilled in the art will understand that there are many ways to determine whether a neighbor is running VPP. VPP-aware bridges preferably hold off on transmitting VPP control packets (either generated by the VPP-aware bridge itself or received by the bridge) until the discovery protocol reports that the neighboring bridge can process VPP control packets. That is, VPP control packets are preferably not sent to neighboring devices that are unable to process them. Furthermore, upon receipt of a GVRP or a VTP packet on a multi-mode switch, the port on which the packet was received reverts to the respective technology.

Those skilled in the art will recognize and understand that other time values besides those mentioned herein may be utilized.

The foregoing description has been directed to specific embodiments of this invention. It will be apparent, however, that other variations and modifications may be made to the described embodiments, with the attainment of some or all of their advantages. Therefore, it is an object of the appended claims to cover all such variations and modifications as come within the true spirit and scope of the invention.

What is claimed is:

1. A method comprising:
    generating, by a VLAN pruning logic of an intermediate network device within a computer network, one or more control packets that include device-local Virtual Local Area Network (VLAN) membership information for the intermediate network device, the device-local VLAN membership information indicating one or more VLANs specifically configured on access ports of the intermediate network device, the device-local VLAN membership information excluding VLAN membership information learned from other intermediate network devices in the computer network that may be reachable through the intermediate network device;
    flooding the one or more control packets on one or more trunk ports of the intermediate network device to distribute control packets that includes the device-local VLAN membership information throughout the computer network;
    transitioning a given trunk port of the intermediate network device to a forwarding spanning tree port state for a given VLAN, to define an active topology within the computer network;
    maintaining a current wanted data structure, the current wanted data structure indicating whether intermediate network devices, accessible via the given trunk port that is in the forwarding spanning tree port state for the given VLAN, have access ports that are associated with the given VLAN, and thereby whether messages associated with given VLAN should be forwarded over the given trunk port that is in the forwarding spanning tree port state for the given VLAN; and
    preventing transmission of a message, associated with the given VLAN, over the given trunk port that is in the forwarding spanning tree port state for the given VLAN, unless the current wanted data structure indicates that there are intermediate network devices accessible via the given trunk port that have access ports that are associated with the given VLAN and thereby that messages associated with given VLAN should be forwarded over the given trunk port.

2. The method of claim 1 further comprising:
    transmitting a message, associated with the given VLAN, over the given trunk port that is in the forwarding spanning tree port state for the given VLAN, provided that the current wanted data structure indicates that there are intermediate network devices accessible via the given trunk port that have access ports that are associated with the given VLAN and thereby that messages associated with given VLAN should be forwarded over the given trunk port.

3. The method of claim 1 wherein the one or more VLANs specifically configured on access ports of the intermediate network device are configured by a network administrator.

4. The method of claim 1 wherein the transitioning is performed by a spanning tree protocol executing on the intermediate network device in the computer network, the spanning tree protocol transitioning the given trunk port of the intermediate network device to the forwarding spanning tree port state from a blocking spanning tree port state.

5. The method of claim 1 further comprising:
    associating a VLAN wanted vector with the given trunk port, the VLAN wanted vector having one or more bits for each VLAN defined within the computer network; and
    in response to receipt of a control packet forwarded by another intermediate network device in the computer network, asserting certain bits of the VLAN wanted vector to signify that messages associated with certain VLANs are to be forwarded over the given trunk port.

6. The method of claim 1 wherein the generating and flooding is performed in response to a port being associated with a new VLAN.

7. A intermediate network device for use in a computer network, comprising:
    a plurality of ports configured to receive and send messages in the computer network, the plurality of ports including one or more access ports and one or more trunk ports; and
    one or more logic circuits configured to
        generate one or more control packets that include device-local Virtual Local Area Network (VLAN) membership information for the intermediate network device, the device-local VLAN membership information indicating one or more VLANs specifically configured on the one or more access ports of the intermediate network device, the device-local VLAN membership information excluding VLAN membership information learned from other intermediate network devices in the computer network that may be reachable through the intermediate network device,
        flood the one or more control packets on the one or more trunk ports of the intermediate network device to distribute control packets that includes the device-local VLAN membership information throughout the computer network,
        transition a given trunk port of the intermediate network device to a forwarding spanning tree port state for a given VLAN, to define an active topology within the computer network,
        maintain a current wanted data structure, the current wanted data structure indicating whether intermediate network devices, accessible via the given trunk port that is in the forwarding spanning tree port state for the given VLAN, have access ports that are associated with the given VLAN, and thereby whether messages associated with given VLAN should be forwarded over the given trunk port that is in the forwarding spanning tree port state for the given VLAN, and prevent transmission of a message, associated with the given VLAN, over the given trunk port that is in the forwarding spanning tree port state for the given VLAN, unless the current wanted data structure indicates that there are intermediate network devices accessible via the given trunk port that have access ports that are associated with the given VLAN and thereby that messages associated with given VLAN should be forwarded over the given trunk port.

8. The intermediate network device of claim 7 wherein the one or more logic circuits are configured to transmit a message, associated with the given VLAN, over the given trunk port that is in the forwarding spanning tree port state for the given VLAN, provided that the current wanted data structure indicates that there are intermediate network devices accessible via the given trunk port that have access ports that are associated with the given VLAN and thereby that messages associated with given VLAN should be forwarded over the given trunk port.

9. The intermediate network device of claim 7 wherein the one or more VLANs specifically configured on access ports of the intermediate network device are configured by a network administrator.

10. The intermediate network device of claim 7 wherein the one or more logic circuits are configured to transition the given trunk port of the intermediate network device to the forwarding spanning tree port state from a blocking spanning tree port state.

11. The intermediate network intermediate network device of claim 7 wherein the one or more logic circuits are configured to associate a VLAN wanted vector with the given trunk port, the VLAN wanted vector having one or more bits for each VLAN defined within the computer network, and in response to receipt of a control packet forwarded by another intermediate network device in the computer network, assert certain bits of the VLAN wanted vector to signify that messages associated with certain VLANs are to be forwarded over the given trunk port.

12. The intermediate network device of claim 7 wherein the one or more logic circuits are configured to generate the one or more control packets and flood the one or more control packets in response to a port being associated with a new VLAN.

* * * * *